(12) United States Patent
Moen et al.

(10) Patent No.: US 7,673,716 B2
(45) Date of Patent: Mar. 9, 2010

(54) DRIVE UNIT ENCLOSURE ASSEMBLY

(75) Inventors: Richard A. Moen, Glenwood, MN (US); Dane M. Kallevig, Spicer, MN (US)

(73) Assignee: CNH America, LLC, New Holland, PA (US)

( * ) Notice: Subject to any disclaimer, the term of this patent is extended or adjusted under 35 U.S.C. 154(b) by 753 days.

(21) Appl. No.: 11/424,680

(22) Filed: Jun. 16, 2006

(65) Prior Publication Data
US 2007/0289790 A1 Dec. 20, 2007

(51) Int. Cl.
B62D 25/10 (2006.01)
(52) U.S. Cl. .................................................... 180/69.2
(58) Field of Classification Search ................ 180/69.2, 180/69.21, 69.24; 296/193.11
See application file for complete search history.

(56) References Cited

U.S. PATENT DOCUMENTS

| | | | |
|---|---|---|---|
| 1,446,814 A | 2/1923 | Scott | |
| 1,825,134 A | 9/1931 | Storms | |
| 1,872,467 A | 8/1932 | Kuika | |
| 2,086,172 A | 7/1937 | Northup | |
| 2,090,473 A * | 8/1937 | Crabb | 217/60 C |
| 2,311,965 A | 2/1943 | Reynolds | |
| 2,410,734 A | 11/1946 | Hitzelberger | |
| 2,733,772 A | 2/1956 | Lamb | |
| 2,761,523 A * | 9/1956 | Lee | 180/69.2 |
| 2,781,102 A * | 2/1957 | Prichard | 180/89.14 |
| 2,952,328 A | 9/1960 | Steiner | |
| 2,962,107 A | 11/1960 | Mihal et al. | |
| 3,216,760 A | 11/1965 | Buchwald | |
| 3,225,856 A * | 12/1965 | Caramanna | 180/69.21 |
| 3,743,045 A * | 7/1973 | Hansen | 180/69.24 |
| 3,918,540 A | 11/1975 | Haupt | |
| 4,143,733 A * | 3/1979 | Morello et al. | 180/69.24 |
| 4,588,220 A * | 5/1986 | Matsui et al. | 292/338 |
| 5,645,134 A | 7/1997 | Frankel et al. | |
| 6,116,366 A | 9/2000 | Creswick et al. | |
| 6,626,256 B2 | 9/2003 | Dennison et al. | |
| 6,669,274 B2 | 12/2003 | Barnard et al. | |
| 2001/0004949 A1 | 6/2001 | Burgo | |
| 2006/0000660 A1 | 1/2006 | Moen et al. | |

FOREIGN PATENT DOCUMENTS

EP 0515737 A1 12/1992

\* cited by examiner

*Primary Examiner*—Frank B Vanaman
(74) *Attorney, Agent, or Firm*—Rebecca L. Henkel; John William Stader

(57) ABSTRACT

An enclosure assembly configured to enhance accessibility to a drive unit of a vehicular agricultural applicator is provided. The enclosure assembly generally includes a housing, and a hinged panel pivotal about an axis defined by a hinge assembly between an open and a closed position with respect to the housing. The axis is generally aligned in a fore and aft direction. The enclosure assembly further includes an arm pivotally coupled at the hinged panel and movable between a stowed position and an extended position. In the folded position, the arm is retained in a slot at the hinged panel. In the extended position, the arm is in general vertical alignment engaged at the housing so as to hold the hinged panel in the open position.

19 Claims, 5 Drawing Sheets

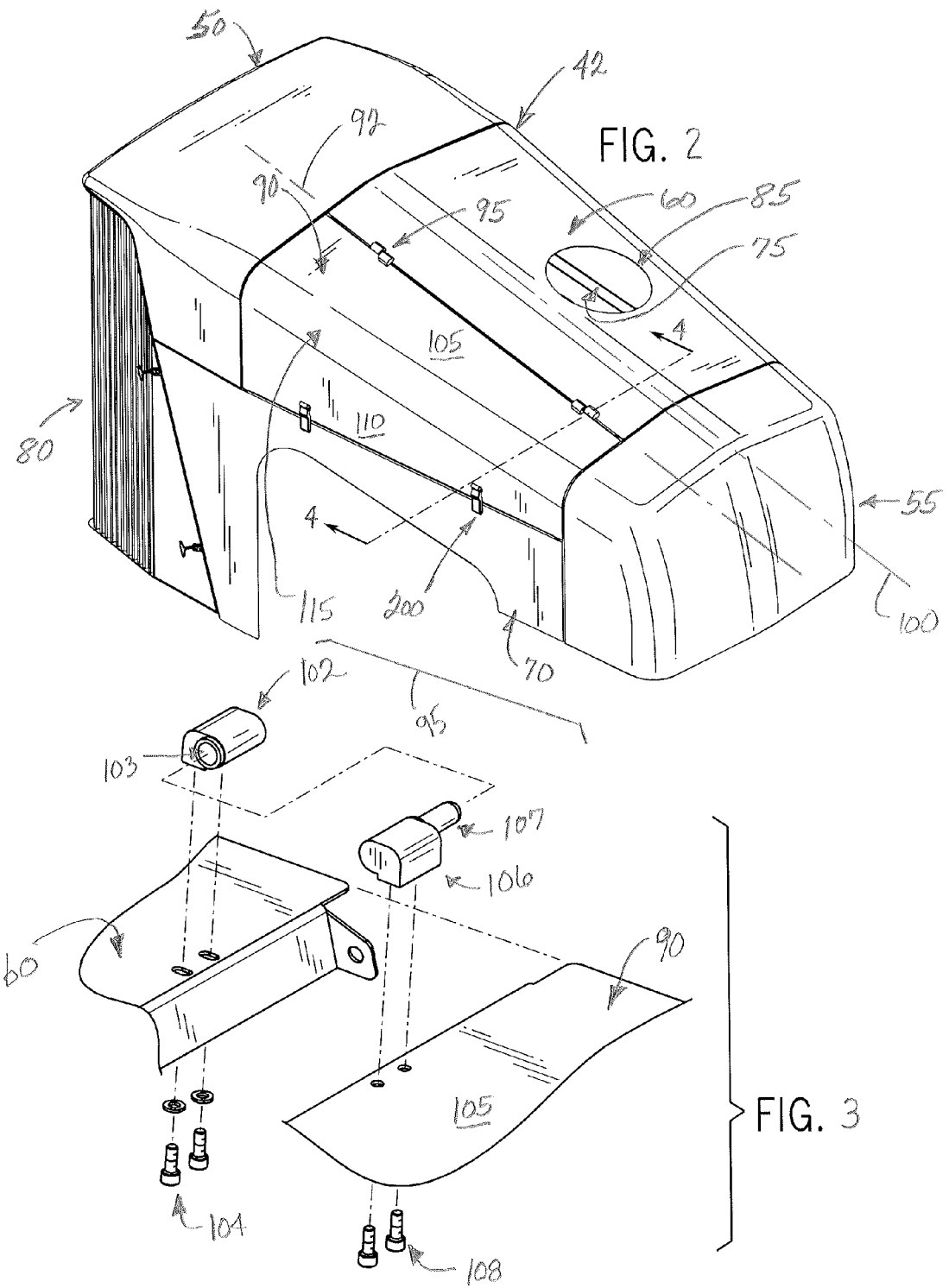

DRIVE UNIT ENCLOSURE ASSEMBLY

CROSS-REFERENCE TO RELATED APPLICATIONS

Not applicable.

BACKGROUND OF THE INVENTION

1. Field of Invention

The invention relates to a drive unit enclosure assembly and, more particularly, to an agricultural applicator with a drive unit and an associated enclosure assembly having a first hinged panel and a second hinged panel configured to enhance access to the drive unit.

2. Related References

Numerous types of self-propelled vehicular agricultural applicators are available today. A certain known self-propelled vehicular agricultural applicator is also referred to a "floater." The floater is a large vehicle that uses large, oversized floatation tires to carry the vehicle across firm to muddy agricultural environments. The chassis assembly of the floater generally includes three or more floatation tires. One particular chassis assembly includes a pair of rear floatation tires and a pair of front floatation tires. The chassis assembly is configured to support one or more bulk storage tanks or bins of product for application in an agricultural environment, usually before planting in the spring or after harvest in the fall. The types of agricultural products e.g., fertilizer, herbicide, pesticide, nutrients, etc. can vary. The floater can also be utilized to tow various agricultural implements.

However, these floater-type of agricultural applicators have drawbacks. For example, certain known floater-type vehicular agricultural applicators include an enclosure for a drive unit mounted toward a rearward end of the chassis assembly and behind a cab relative to a forward direction of travel of the agricultural applicator. A raised platform or walkway is provided from the cab to the drive unit enclosure. The drive unit enclosure typically includes a single-piece hood operable to be opened so as to provide access to the drive unit. The single-piece hood generally does not provide adequate access to routine service points (e.g., air filter, oil level dipstick, engine valve backlash, etc.) of the drive unit. In addition, the single-piece hood generally extends the length of the drive unit and therefore is too heavy and cumbersome for a single person to move between a closed position and an open position.

Thus, there is a need for an enclosure for a drive unit configured to enhance ease of access to routine service points of the drive unit, and that is operable for a single person to readily move between an open and closed positions.

SUMMARY OF THE INVENTION

The present invention provides an enclosure assembly for a drive unit of an agricultural applicator. The agricultural applicator includes a frame assembly to support the drive unit on a plurality of wheel assemblies. The enclosure assembly generally includes a housing, and a hinged panel pivotal about an axis defined by a hinge assembly between an open and a closed position with respect to the housing. The axis is generally aligned in a fore and aft direction. The enclosure assembly further includes an arm pivotally coupled at the hinged panel and movable between a stowed, folded position and an extended position. In the folded position, the arm is retained in a slot at the hinged panel. In the extended position, the arm is in general vertical alignment engaged at the housing so as to hold the hinged panel in the open position. The pivoting hinged panel in combination with the arm enhances the ease and readiness in accessing and servicing the drive unit.

In a preferred embodiment of the enclosure assembly, an uppermost surface of the hinged panel in the closed position is in generally flush alignment with a surface of an uppermost wall of the housing. The hinged panel includes first linear portion and a second linear portion and a curvilinear portion extending there between, wherein in the closed position, the first linear portion is in general linear alignment with an uppermost wall of the housing and the second portion is in general linear alignment with a sidewall of the housing, where the sidewall of the housing is generally vertically aligned. The preferred enclosure assembly further comprises a latch mechanism attached at the housing. The latch mechanism is generally configured to releasably secure the hinged panel in the closed position with respect to the housing.

In the preferred embodiment of the enclosure assembly, the aim includes a first end pivotally coupled at the second portion of the hinged panel. The preferred enclosure assembly further includes a rib member attached at and extending between the first and second linear portions of the hinged panel. The preferred rib member is generally vertically aligned in perpendicular alignment with the first and second linear portions of the hinged panel. The rib member includes the slot configured to receive the arm in the stowed, folded position underneath the hinged panel. The preferred slot is generally elongated and curvilinear shaped such that an enclosed end of the slot is located between an open end of the slot and a radically most outward portion of the slot relative to a central longitudinal axis of the enclosure.

The present invention also provides an agricultural applicator that includes a wheeled frame assembly mounted on a plurality of wheel assemblies, and a drive unit mounted on the wheeled frame assembly. The drive unit is configured to drive the agricultural applicator on the plurality of wheel assemblies in at least a forward direction of travel. The agricultural applicator further includes an enclosure assembly for the drive unit in accordance with the present invention. The enclosure assembly generally includes a housing, and a hinged panel pivotal about an axis defined by a hinge assembly between an open and a closed position with respect to the housing. The axis is generally aligned in a fore and aft direction. The enclosure assembly further includes an arm pivotally coupled at the hinged panel and movable between a stowed, folded position and an extended position. In the folded position, the arm is retained in a slot at the hinged panel. In the extended position, the arm is in general vertical alignment engaged at the housing so as to hold the hinged panel in the open position.

The present invention also provides a method of accessing a drive unit of an agricultural applicator generally in accordance with the foregoing description.

Other objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout.

FIG. 2 illustrates a detailed isometric view of the enclosure assembly shown in FIG. 1.

FIG. 3 illustrates an exploded isometric view of the hinge assembly of the enclosure assembly shown in FIG. 1.

DETAILED DESCRIPTION OF THE PREFERRED EMBODIMENTS

Figure 1:
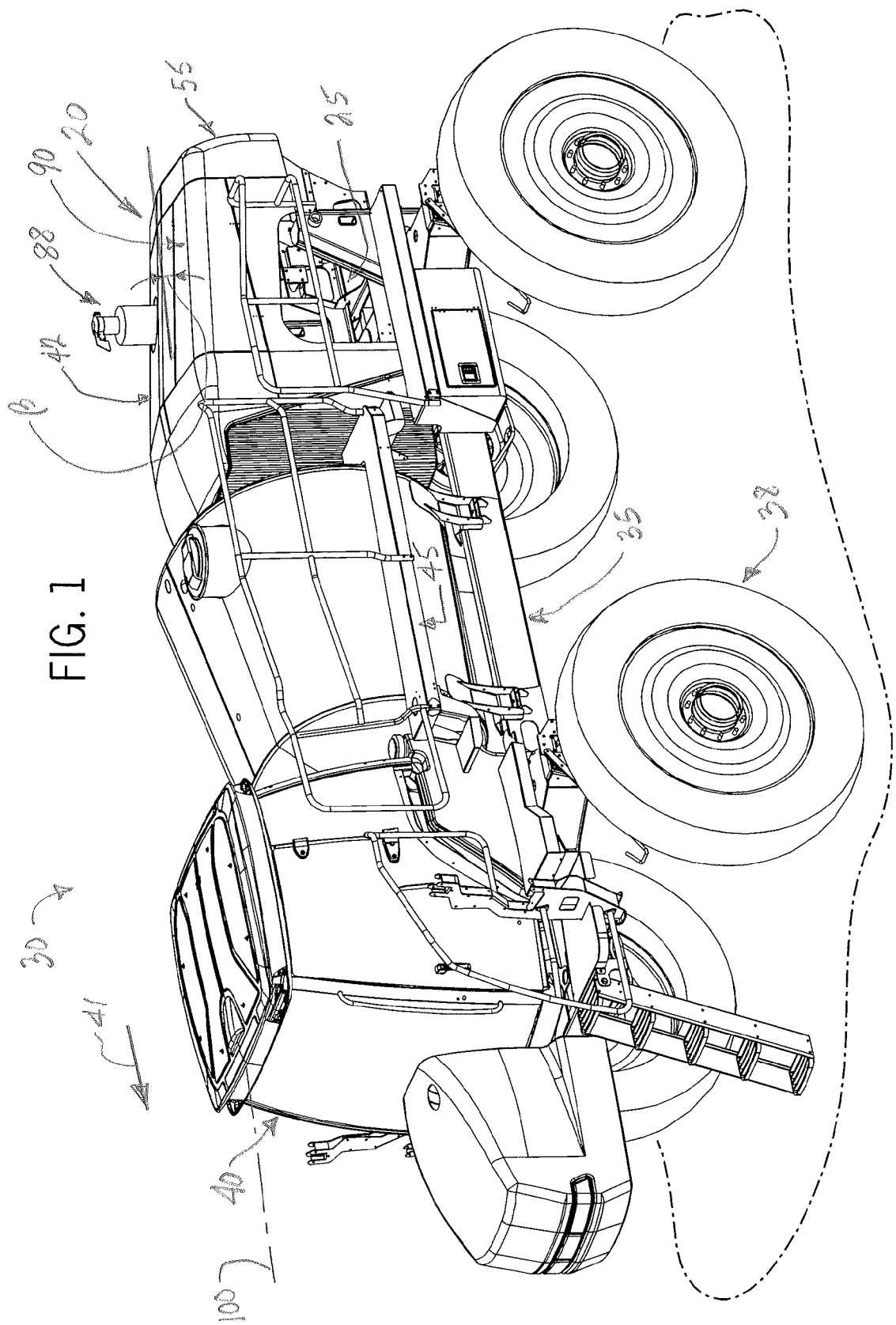
FIG. 1 illustrates an isometric view of a four-wheeled agricultural applicator having an enclosure assembly for a drive unit in accordance with the present invention, the enclosure in a closed position.

FIG. 1 illustrates an enclosure assembly 20 in accordance with the present invention enclosing a drive unit 25 of a vehicle 30. The exemplary vehicle 30 is an agricultural applicator having a wheeled frame assembly 35 configured to support the drive unit 25 on a series of wheel assemblies 38. Although a four-wheeled vehicular agricultural applicator is shown, it is understood that the number of wheel assemblies 38 can vary. The vehicle 30 further includes a cab 40 positioned on the frame assembly 35. The drive unit 25 is positioned rearward from the cab 40 relative to a forward direction of travel (illustrated by arrow 41) of the vehicle 30.

Still referring to FIG. 1, as is commonly known in the art, the preferred drive unit 25 includes a radiator (not shown) disposed at a forward end of the drive unit 25, a hydraulic reservoir disposed at a rearward end of the drive unit 25, and an engine drive disposed there between. The radiator cools the engine drive in a known manner. The hydraulic reservoir provides hydraulic flow and pressure to various hydraulically-driven systems or components (e.g., booms, fans, etc.) of the vehicle 30. The engine drive is interconnected to propel at least one of the wheel assemblies 38 of the vehicle 30 in the forward direction of travel 41. Although a preferred drive unit 25 is described and shown, the type (e.g., diesel, etc.) and components (e.g., hydraulic system, pneumatic system, etc.) and combinations thereof comprising the drive unit 25 can vary and is not limiting on the invention.

A raised walkway or platform 45 extends from the cab 40 toward the enclosure assembly 20. The raised walkway 45 allows an operator at the cab 40 ready access to the enclosure assembly 20 and thereby to routine service points of the respective drive unit 25 enclosed therein.

Referring to FIGS. 2-6, the enclosure assembly 20 of the present invention generally includes a housing 42 having a forward fixed portion 50, a rearward fixed portion 55, an uppermost fixed portion 60, and a pair of fixed sidewalls 70 and 75 extending generally upwardly in the vertical direction to the uppermost fixed portion 60. The forward fixed portion 50 of the housing 42 attaches a radiator grille arrangement 80 located generally adjacent to the radiator of the drive unit 25 enclosed by the enclosure assembly 20.

The uppermost fixed portion 60 of the housing 42 includes a first cutout portion 85 configured to receive at least a first portion of an exhaust outlet 88 (e.g., muffler) extending there through vertically upward from the enclosed drive unit 25. The exemplary cutout portion 85 is generally curvilinear-shaped to receive the cylindrical-shaped exhaust outlet 88, yet the shape (e.g., polygonal, cylindrical, etc.) of the cutout portion 85 can vary.

The enclosure assembly 20 further includes a hinged panel 90 pivotal about an axis 92 defined by one or more hinge assemblies 95 between an open and a closed position with respect to the housing 42. The axis 92 is generally aligned in a fore and aft direction in parallel alignment to, and spaced a lateral distance from, a central longitudinal axis 100 of the enclosure 20 and the vehicle 30. The exemplary hinge assembly 95 includes a first portion 102 having a female adaptor 103 connected by fasteners 104 at the uppermost fixed portion 60 of the housing 42, configured to pivotally interconnect with a second portion 106 having a female adaptor 107 attached by fasteners 108 at the hinged panel 90.

Figure 4:
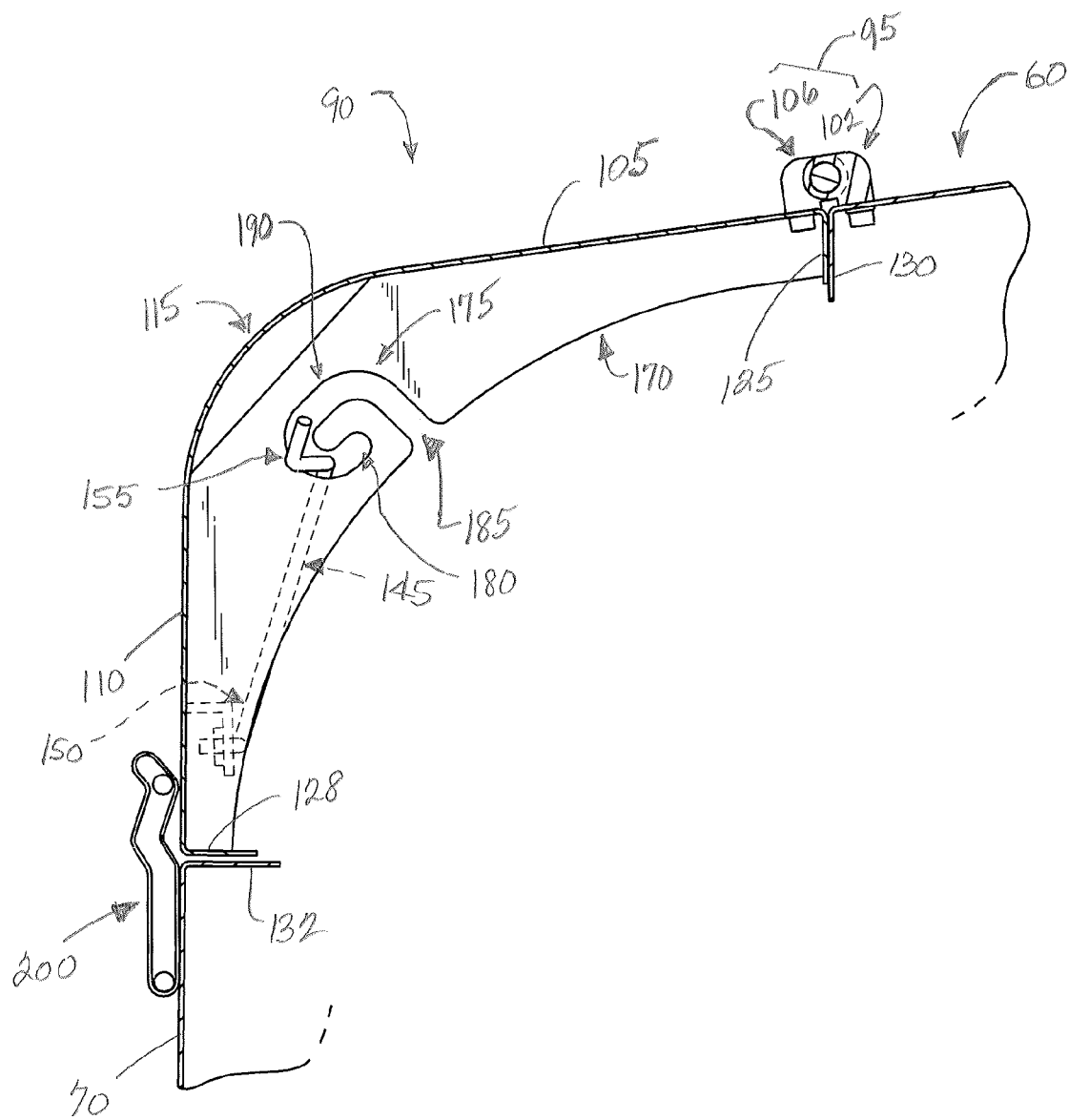
FIG. 4 illustrates a detailed section view along line 4-4 in FIG. 1, the hinged panel in a closed position.

The exemplary hinged panel 90 generally includes first linear portion 105 and a second linear portion 110 and a curvilinear portion 115 connecting there between. In the closed position as shown in FIGS. 1, 2 and 4, the first linear portion 105 of the hinged panel 90 is in general linearly flush alignment with the uppermost fixed portion 60 of the housing 42, and the second portion 110 is in general linearly flush alignment with the abutting fixed sidewall 70 of the housing 42. The hinged panel 90 can vary in dimension such that it extends entirely or only a portion of a distance between the forward most and rearward most fixed portions 50 and 55 of the housing 42. The first linear portion 105 of the hinged panel 90 is sloped at an angle ($\beta$) downward from vertical, providing an operator with an enhanced rearward view from the cab 40. The hinged panel 90 further includes a pair of inward extending lip portions 125 and 128. In the closed position, the inward lip portions 125 and 128 of the hinged panel 90 are in generally parallel alignment with compatible inward lip portions 130 and 132 at the abutting uppermost fixed portion 60 and the fixed sidewall 70, respectively, of the housing 42. The lip portions 125 and 128 of the hinged panel 90 in combination with the lip portions 130 and 132 of the housing enhance stability and reduce debris from entering the enclosure assembly 20.

From the closed position shown in FIGS. 1, 2 and 4, the hinged panel 90 is configured to swing or pivot upwardly in the vertical direction toward an open position (See FIG. 5) in a laterally inward direction (shown as direction arrow 140) toward the central longitudinal axis 100. In the open position as shown in FIG. 5, the hinged panel 90 provides ready access to the routine service points of the drive unit 25 (See FIG. 1) located in the enclosure assembly 20.

Figure 5:
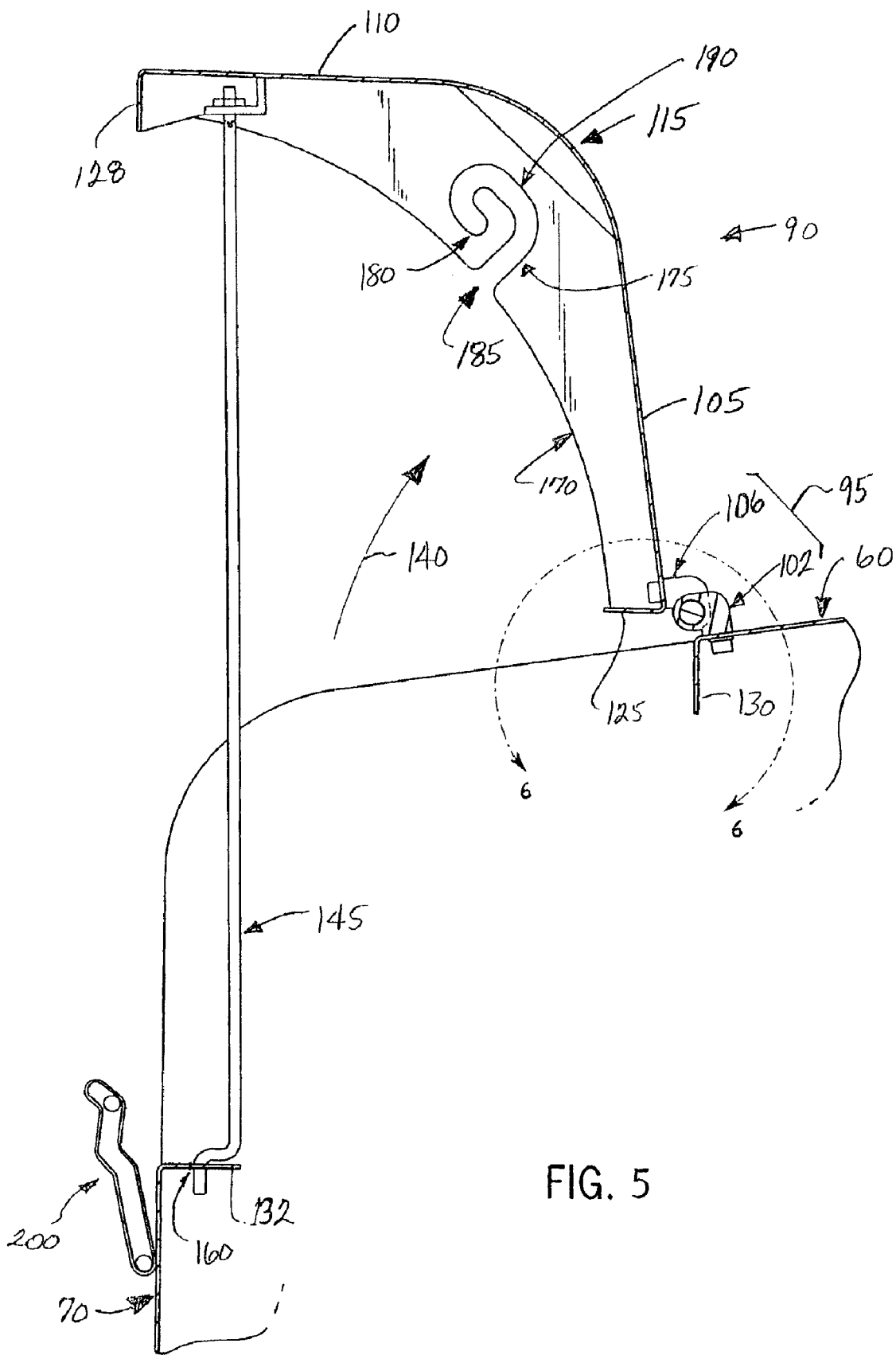
FIG. 5 illustrates a detailed section of the enclosure assembly shown in FIG. 4, the hinged panel in an open position.
Figure 6:
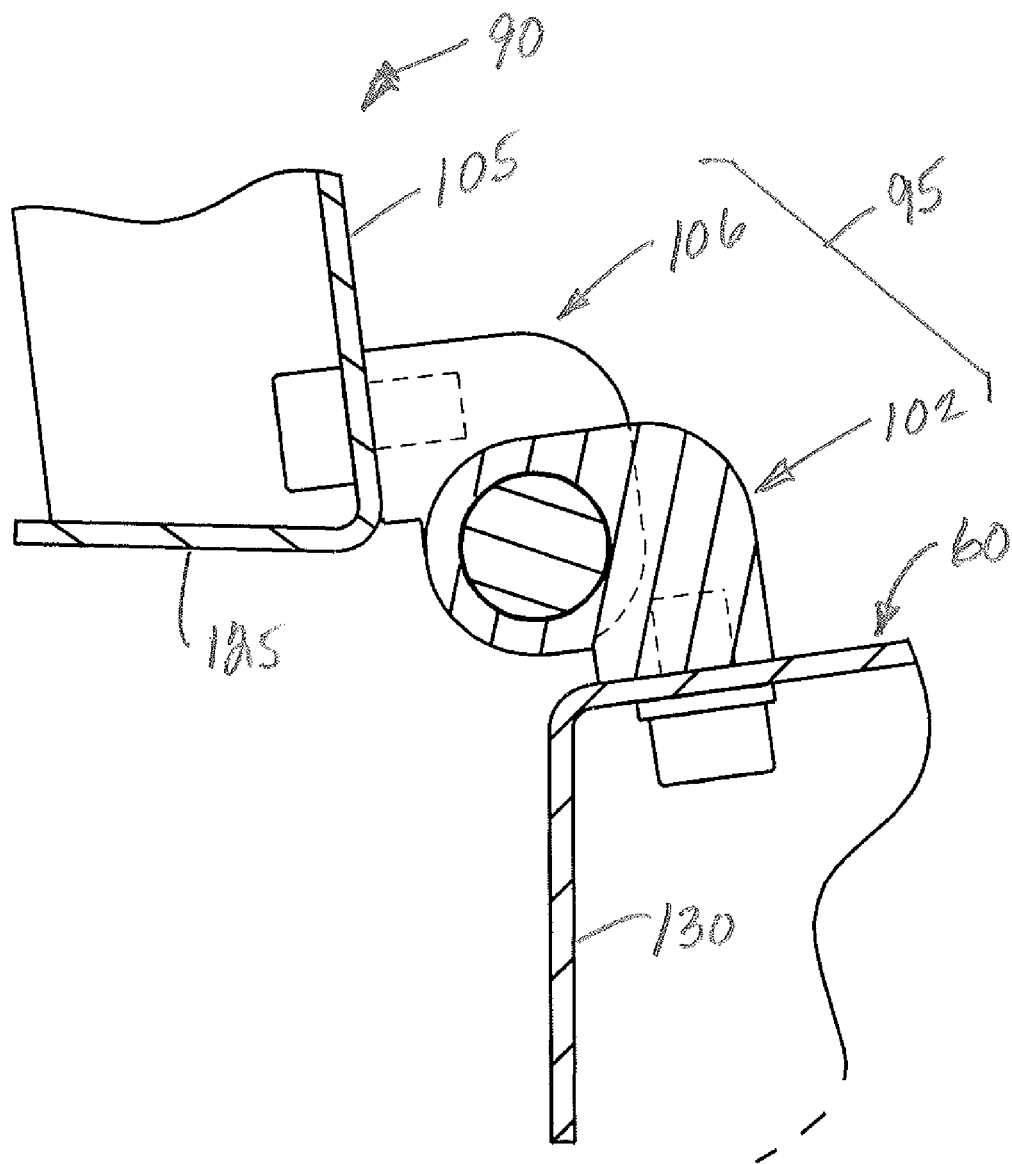
FIG. 6 illustrates a detailed section view along line 6-6 in FIG. 5.

Referring now to FIGS. 4 and 5, the enclosure assembly 20 further includes an arm 145 pivotally coupled at the hinged panel 90 and movable between a stored position (See FIG. 4) and an extended position (See FIG. 5). The arm 145 includes a first end 150 pivotally coupled at the second portion 110 of the hinged panel 90 opposite a free end 155. The arm 145 in the extended positioned is retained in general vertical alignment in a slot 160 at the fixed sidewall 70 of the housing 42 so as to hold the hinged panel 90 in the open position.

A rib 170 is attached at, and extends laterally between, the first and second linear portions 105 and 110 of the hinged panel 90. The rib 170 is generally vertically aligned in perpendicular alignment with the first and second linear portions 105 and 110 of the hinged panel 90. Relative to the hinge assembly 95, radically inward most end 172 of the rib 170 is abutted against the lip portion 125, while an opposite radically outward most end of the rib is abutted against lip portion 128. This design enhances the stability of the hinged panel 90. The rib 170 generally includes a slot 175 to retain the arm in a folded, stored position underneath the hinged panel 90. The exemplary slot 175 is generally elongated and spiral shaped such that an enclosed end 180 is located between an open end 185 of the slot 175 and a radically most outward end 190 of the slot 175 relative to the open end 185. This configuration of the slot 175 operates to detachably restrain the arm 145 so as to move with the hinged panel 90 between the open and closed positions.

A latch mechanism 200 releasably couples the hinged panel 90 in the closed position against the housing 42 as shown in FIG. 1. The number, location, and type (e.g., hook assembly, sliding bolt assembly, etc.) of latch mechanisms 200 can vary.

In operation, assume for example that the hinged panel 90 of the enclosure assembly 20 is detachably retained by the latch mechanism 200 in a closed positioned against the fixed housing 42 (See FIGS. 1 and 2). An operator releases the latch mechanism 200 so as to release movement of the hinged panel 90. Upon release of the hinged panel 90, the operator freely swings or pivots the hinged panel 90 upwardly and in a laterally inward direction (shown as direction arrow 140 in FIG. 5) about the axis 92 relative the central longitudinal axis 100 of the enclosure assembly 20. The arm 145 is retained in the stowed, folded position by the spiral shaped slot 175 underneath the hinged panel 90 so as to move with the hinged panel 90 between closed and open positions. With the hinged panel 90 in the open position shown in FIG. 5, the operator releases the arm 145 from the slot 175 and freely pivots the arm 145 downwardly to an extended, generally vertically aligned position in retention by the slot 160 at the fixed sidewall 70. The arm 145 in the extended positioned engaged against the fixed sidewall 70 of the housing 42 of the enclosure assembly 20 in a manner holding the hinged panel 90 in the open position. With the hinged panel 90 secured in the open position (See FIG. 5) by the arm 145, the operator can gain ready access to the routine service points of the drive unit 25 (See FIG. 1) enclosed in the enclosure assembly 20. The routine service points of the drive unit 25 can include the engine oil dipstick, the hydraulic reservoir dipstick, and the air filter.

A wide variety of vehicles 30 could be constructed in accordance with the invention defined by the claims. Hence, while preferred embodiments of the enclosure assembly 20 in accordance with the invention is described with reference to a drive unit 25 for a four-wheeled agricultural applicator, it should be understood that the invention is in no way so limited. The enclosure assembly 20 can be configured for any type of drive unit 25 (e.g., hydraulic, pneumatic, mechanical, electrical, etc.) or combinations thereof of any type of mobile vehicle 30.

Many changes and modifications could be made to the invention without departing from the spirit thereof. The scope of these changes will become apparent from the appended claims.

We claim:

1. An enclosure assembly for a drive unit of an agricultural applicator, the agricultural applicator having a frame assembly supporting the drive unit on a plurality of wheel assemblies in a forward direction of travel, the drive unit including an exhaust outlet extending upward from the drive unit, the enclosure assembly comprising:
    a housing having a forward fixed portion, a rearward fixed portion, an uppermost fixed portion and a pair of fixed sidewalls extending generally upwardly in a vertical direction to the uppermost fixed portion; said uppermost fixed portion of said housing includes a first cutout position configured to receive said exhaust outlet;
    a hinged panel pivotal about an axis defined by a hinge assembly between an open and a closed position with respect to the housing, the axis generally aligned in a fore and aft direction; and
    an arm pivotally coupled at the hinged panel and movable between a stored position and an extended position, the arm in the stored position is retained in a slot at the hinged panel and the arm in the extended positioned in general vertical alignment engaged at the housing so as to hold the hinged panel in the open position.

2. The enclosure assembly as recited in claim 1, wherein an uppermost surface of the hinged panel in the closed position is in generally flush alignment with a surface of an uppermost wall of the housing.

3. The enclosure assembly as recited in claim 2, further comprising:
    a latch mechanism attached at the housing and configured to detachably retain the hinged panel in the closed position.

4. The enclosure assembly as recited in claim 1, wherein the hinged panel includes first linear portion and a second linear portion and a curvilinear portion extending therebetween, wherein in the closed position, the first linear portion is in general linear alignment with an uppermost wall of the housing and the second portion is in general linear alignment with a sidewall of the housing, wherein the sidewall of the housing is generally vertically aligned.

5. The enclosure assembly as recited claim 4, wherein the arm includes a first end pivotally coupled at the second portion of the hinged panel.

6. The enclosure assembly as recited in claim 4, further comprising a rib member attached at and extending between the first and second linear portions of the hinged panel.

7. The enclosure assembly as recited in claim 6, wherein the rib member is generally vertically aligned in perpendicular alignment with the first and second linear portions of the hinged panel.

8. The enclosure assembly as recited in claim 6, wherein the rib member includes the slot.

9. The enclosure assembly as recited in claim 1, wherein the slot is generally elongated and curvilinear shaped such that an enclosed end of the slot is located between an open end of the slot and a radially most outward portion of the slot relative to a central longitudinal axis of the enclosure.

10. A agricultural applicator comprising:
    a wheeled frame assembly supported on a plurality of wheel assemblies;
    a cab positioned on the said wheeled frame assembly;
    at least one bulk storage tank mounted on the wheeled frame assembly behind said cab;
    a drive unit positioned rearward from said at least one bulk storage tank and mounted on the wheeled frame assembly, the drive unit configured to drive the agricultural applicator on the plurality of wheel assemblies in a forward direction of travel, the drive unit including an exhaust outlet extending upward from the drive unit;
    a raised walkway extending from said cab towards said drive unit; and
    an enclosure assembly for the drive unit, the enclosure assembly comprising:
        a housing having a forward fixed position, a rearward fixed portion, an uppermost fixed portion and a pair of fixed sidewalls extending generally upwardly in a vertical direction to the uppermost fixed portion; said uppermost fixed portion of said housing includes a first cutout position configured to receive said exhaust outlet;

a hinged panel pivotal about an axis defined by a hinge assembly between an open and a closed position with respect to the housing, the axis generally aligned in a fore and aft direction; and an arm pivotally coupled at the hinged panel and movable between a stored position and an extended position, the arm in the stored position is retained in a slot at the hinged panel and the arm in the extended positioned in general vertical alignment engaged at the housing so as to hold the hinged panel in the open position.

11. The vehicle as recited in claim 10, wherein an uppermost surface of the hinged panel in the closed position is in generally flush alignment with a surface of an uppermost wall of the housing.

12. The vehicle as recited in claim 11, further comprising:

a latch mechanism attached at the housing and configured to detachably retain the hinged panel in the closed position.

13. The vehicle as recited in claim 10, wherein the hinged panel includes first linear portion and a second linear portion and a curvilinear portion extending therebetween, wherein in the closed position, the first linear portion is in general linear alignment with an uppermost wall of the housing and the second portion is in general linear alignment with a sidewall of the housing, wherein the sidewall of the housing is generally vertically aligned.

14. The vehicle as recited claim 13, wherein the arm includes a first end pivotally coupled at the second portion of the hinged panel.

15. The vehicle as recited in claim 13, further comprising a rib attached at and extending between the first and second linear portions of the hinged panel.

16. The vehicle as recited in claim 15, wherein the rib is generally vertically aligned in perpendicular alignment with the first and second linear portions of the hinged panel.

17. The vehicle as recited in claim 15, wherein the rib includes the slot.

18. The vehicle as recited in claim 10, wherein the slot is generally elongated and spiral shaped such that an enclosed end of the slot is located between an open end of the slot and a radially most outward portion of the slot relative to a central longitudinal axis of the enclosure.

19. The vehicle as recited in claim 10, wherein the hinged panel includes a first lip portion extending inwardly of the enclosure assembly in general parallel alignment with a second lip portion of the housing.

* * * * *